United States Patent
Huffman

(10) Patent No.: US 6,849,107 B1
(45) Date of Patent: Feb. 1, 2005

(54) AIR FILTRATION SYSTEM

(76) Inventor: Fred Huffman, 4524 NE. 12th St., Ocala, FL (US) 34470

( * ) Notice: Subject to any disclaimer, the term of this patent is extended or adjusted under 35 U.S.C. 154(b) by 0 days.

(21) Appl. No.: 10/319,897

(22) Filed: Dec. 16, 2002

(51) Int. Cl.⁷ ............................................... B01D 46/10
(52) U.S. Cl. .............................. 96/224; 96/227; 96/288; 95/211; 55/DIG. 35; 55/DIG. 31; 261/80; 250/436; 422/121; 422/122; 422/105; 422/24
(58) Field of Search ..................... 55/DIG. 31, DIG. 35; 95/211; 96/227, 288, 224; 250/436; 261/80; 422/121, 122, 105, 24

(56) References Cited

U.S. PATENT DOCUMENTS

| | | | | |
|---|---|---|---|---|
| 1,553,098 A | * | 9/1925 | Napier | 96/224 |
| 1,937,483 A | * | 11/1933 | Shurtleff | 96/224 |
| 2,359,057 A | * | 9/1944 | Skinner | 96/224 |
| 2,638,644 A | * | 5/1953 | Rauhut | 96/224 |
| 4,990,313 A | * | 2/1991 | Pacosz | 96/224 |
| 5,523,057 A | * | 6/1996 | Mazzilli | 96/224 |
| 5,558,158 A | * | 9/1996 | Elmore | 96/224 |
| 5,656,242 A | * | 8/1997 | Morrow et al. | 96/224 |
| 5,759,239 A | * | 6/1998 | Yu | 96/224 |
| 5,938,823 A | * | 8/1999 | Condit et al. | 96/224 |
| 6,063,170 A | * | 5/2000 | Deibert | 96/224 |
| 6,126,708 A | * | 10/2000 | Mack et al. | 55/502 |
| 6,372,186 B1 | * | 4/2002 | Fencl et al. | 96/224 |
| 6,494,940 B1 | * | 12/2002 | Hak | 96/224 |
| 6,589,486 B1 | * | 7/2003 | Spanton | 96/224 |
| 6,623,544 B1 | * | 9/2003 | Kaura | 96/224 |
| 6,626,984 B1 | * | 9/2003 | Taylor | 96/224 |
| 6,699,301 B1 | * | 3/2004 | Eisenhauer | 55/471 |

* cited by examiner

Primary Examiner—Minh-Chau T. Pham
(74) Attorney, Agent, or Firm—Stephen Lewellyn

(57) ABSTRACT

A new and improved air purifying apparatus having a housing that is adapted to be mounted in-line with an air duct, such as a return air duct of an air-conditioning system. The housing is designed for easy installation without modifying the existing air-conditioning duct work. An ultraviolet light-emitting device is positioned within the housing for radiating the air passing through the return air duct with UV-C and UV-V radiation to destroy air borne chemical and biological odors, bacteria, and microorganisms. A high flow pleated air filter is provided and is removably positioned within the housing for removing air borne particulate material such as dust and pollen.

15 Claims, 6 Drawing Sheets

AIR FILTRATION SYSTEM

BACKGROUND OF THE INVENTION

The present invention relates to an ultraviolet air filtration system for use in connection with air-conditioning systems. It is a well known problem that airborne bacteria and other microorganisms contaminate the air we breathe and the environments we live in. It is also known that exposing the air we breathe to ultraviolet (UV) light provides a germicidal cleaning affect to thereby make the air healthier to breathe. It is further known in the field of air, conditioning that manufactured homes tend to have poor air filtration systems and as such, the air is frequently contaminated with various pollutants, such as mold, pet dander, bacteria, chemical and biological odors, and viruses. In this respect, manufactured homes tend to have poor air filtration due to space limitations usually associated with them, which therefore prevents the installation of good air filtration equipment without high costs to the consumer.

Typically, manufactured homes utilize two different air-conditioning arrangements, the first being a packaged system and the second being a split system. The packaged system provides all of the air-conditioning components within a single enclosure. This enclosure is typically positioned outside of the manufactured home and uses air ducting to facilitate an exchange of air between the enclosure and the internal space of the manufactured home.

A split system places various components of the air-conditioning system outside of the home and other components of the air-conditioning system inside the home. With this arrangement, the air-handling components of the air-conditioning system are positioned within the house, while other components, such as the compressor and condenser, are placed outside of the home.

To overcome the problems relating to contaminated air, there have been various attempts to provide air filtration systems utilizing (UV) light for destroying such air borne material as mentioned above. For example, U.S. Pat. No. 5,558,158, which issued to Elmore, discloses an air handler that discourages and prohibits the growth of undesirable microorganisms by providing an ultraviolet light source. The UV light source is positioned within the air handler in the flow path of air being forced therethrough by a blower. However, while the Elmore '158 patent is functional for its intended purpose, it does not provide a separate unit which can be easily installed in-line with an existing air-conditioning system, thereby necessitating a complete expensive replacement of an existing air handler.

Another patent of interest is U.S. Pat. No. 6,022,511, which issued to Matschke and which discloses an ultraviolet light emitting device for germicidally cleaning air passing through a duct system. The device can be used to replace one or more sections of an existing duct and, in essence, becomes part of the duct work. However, the Matschke'511 patent does not provide for particulate filtration in combination with ultraviolet filtration, and additionally, the modification of the existing duct work as disclosed in this patent could be very time consuming and costly.

Similarly, United States patent application 20020104972 to Guzorek discloses an ultraviolet air-purifying device for installation into existing duct work. However, the invention disclosed in the Guzorek application does not provide a complete and separate system for installation in-line with duct work, and as such, existing duct work would need be modified to accept this device. This is a draw back with a manufactured home in that it is difficult to access the air-conditioning duct work due to the construction methods of the home. In addition to this, if it is ever desired to remove the ultraviolet air purifying device from the modified duct work, the portion of the duct work that was modified to accept the device would have to be replaced or repaired.

Lastly, U.S. Pat. No. 5,225,167, which issued to Wetzel, discloses a room air sterilizer that includes an ultraviolet lamp for radiating air passing through the sterilizer. The sterilizer illustrated in this patent is a self-contained, wall mounted unit that it is not used in conjunction with an air-conditioning system. Additionally, it would be undesirable to use this system with a manufactured home due to the size of the unit and the space limitations present with such homes.

While the above-described devices fulfill their respective, particular objectives and requirements, the aforementioned patents do not describe a compact air filtration system that combines the benefits of good particulate filtration in combination with ultraviolet radiation into one device, wherein the device may be removably installed in-line with the ductwork of an existing air-conditioning system without substantial modification.

Therefore, it can be appreciated that a need exists for a new and improved air filtration system that can be used with existing air-conditioning systems without substantial modification to existing ductwork for purifying the air flowing therethrough. In this regard, the present invention substantially fulfills this need. More particularly, the air filtration system according to the present invention substantially departs from the conventional concepts and designs of the prior art, and in doing so provides an apparatus primarily developed for the purpose of being easily installed in-line with existing air-conditioning systems.

SUMMARY OF THE INVENTION

In view of the above discussion relating to known types of air purification devices, it can be appreciated that the present invention provides an improved air filtration system having advantages not made apparent or disclosed in the prior art. As such, the general purpose of the present invention, which will be described subsequently in greater detail, is to provide a new and improved air filtration system that is both compact and easily installed with existing air-conditioning systems, and that also improves the quality of air by removing air borne chemical and biological odors, bacteria, viruses and allergens. In this respect, it is now apparent that the present invention has all the advantages of the prior art mentioned heretofore and many other novel features that result in an air filtration system which is not anticipated, rendered obvious, suggested, or even implied by the prior art, either alone or in any combination thereof.

Accordingly, a first aspect the present invention consists of a housing adapted to be removably installed in-line with a return air duct of a packaged air-conditioning system typically used with manufactured homes. The housing includes at least one mounting flange for allowing the securement of the housing to the packaged air-conditioning system, and a duct coupling flange allowing the coupling of the return air duct from the manufactured home to the housing, thereby to effectively direct all of the return air through the air filtration system. With this installation, the air filtration system is installed without modifying the existing ductwork. This design provides for a low cost and easy installation of the air filtration system within existing ductwork, and also allows the removal of the air filtration system and returning the ductwork back to the original configuration without having to repair or replace the ducting. The invention farther includes an air filter positioned within the housing for removing air borne particulate material, such as dust, and an ultraviolet (UV) air purifier for exposing the air moving therethrough to UV radiation. The UV purifier of the present invention is designed to destroy chemical and biological orders, bacteria, viruses and allergens, and can be selected from known UV purifiers, such as the UV purifier disclosed in U.S. Pat. No. 5,833,740 which issued to Brais and which is incorporated herein by reference.

A further aspect of the present invention consists of a housing adapted to be installed in-line with a return air duct of a split-type air-conditioning system. The housing includes at least one mounting flange for securing the housing to a surface, a duct coupling flange for allowing the coupling of the return air duct to the housing, an air filter positioned within the housing, a pre-stage filter positioned before the air filter, and an UV air purifier such as the one disclosed in the aforementioned '740 patent to Brais. This aspect of the invention provides all of the benefits that are provided with the first above-mentioned aspect.

The invention may also include an insulation layer lining the interior surface of the housing, a filter access opening and means for releasable retaining the air filter and the pre-stage air filter within the housing. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved air filtration system which is self-contained and compact in nature and which is easily installed with existing air-conditioning systems.

It is another object of the present invention to provide a new and improved air filtration system that is removably installed with air-conditioning systems.

An even further object of the present invention is to provide a new and improved air filtration system that has a low cost of manufacture with regard to both materials and labor, and which accordingly is then susceptible of low prices of sale to the consuming public, thereby making such air filtration system economically available to the buying public.

Still another object of the present invention is to provide a new air filtration system that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE DRAWINGS

The present invention provides a compact air filtration system that combines the germicidal cleansing benefits of UV radiated air and hepa benefits associated with a high flow air filter having small micron filtering. The air filtration system is contained within a housing that is easily installed in-line with existing ductwork, such as the return air duct of an air-conditioning system. The housing is designed to allow installation with existing ductwork without modification to the ductwork, and an average consumer, who may not have extensive knowledge about air-conditioning systems, can perform the installation relatively easily. The objectives and advantages of the invention will become apparent in the following discussion of the drawings.

Figure 1:
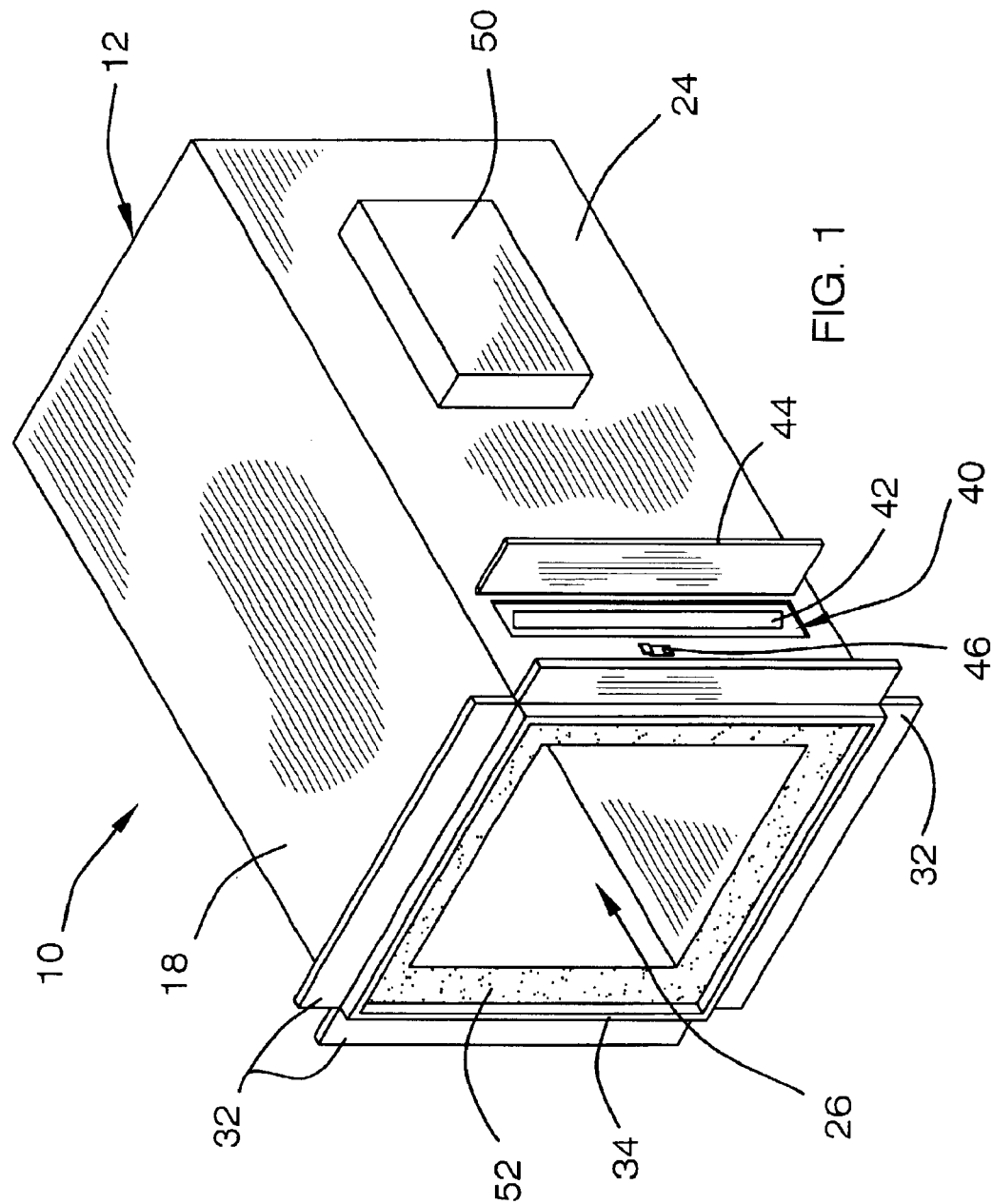
FIG. 1 is a front isometric view of the air filtration system constructed in accordance with the principles of the present invention.
Figure 2:
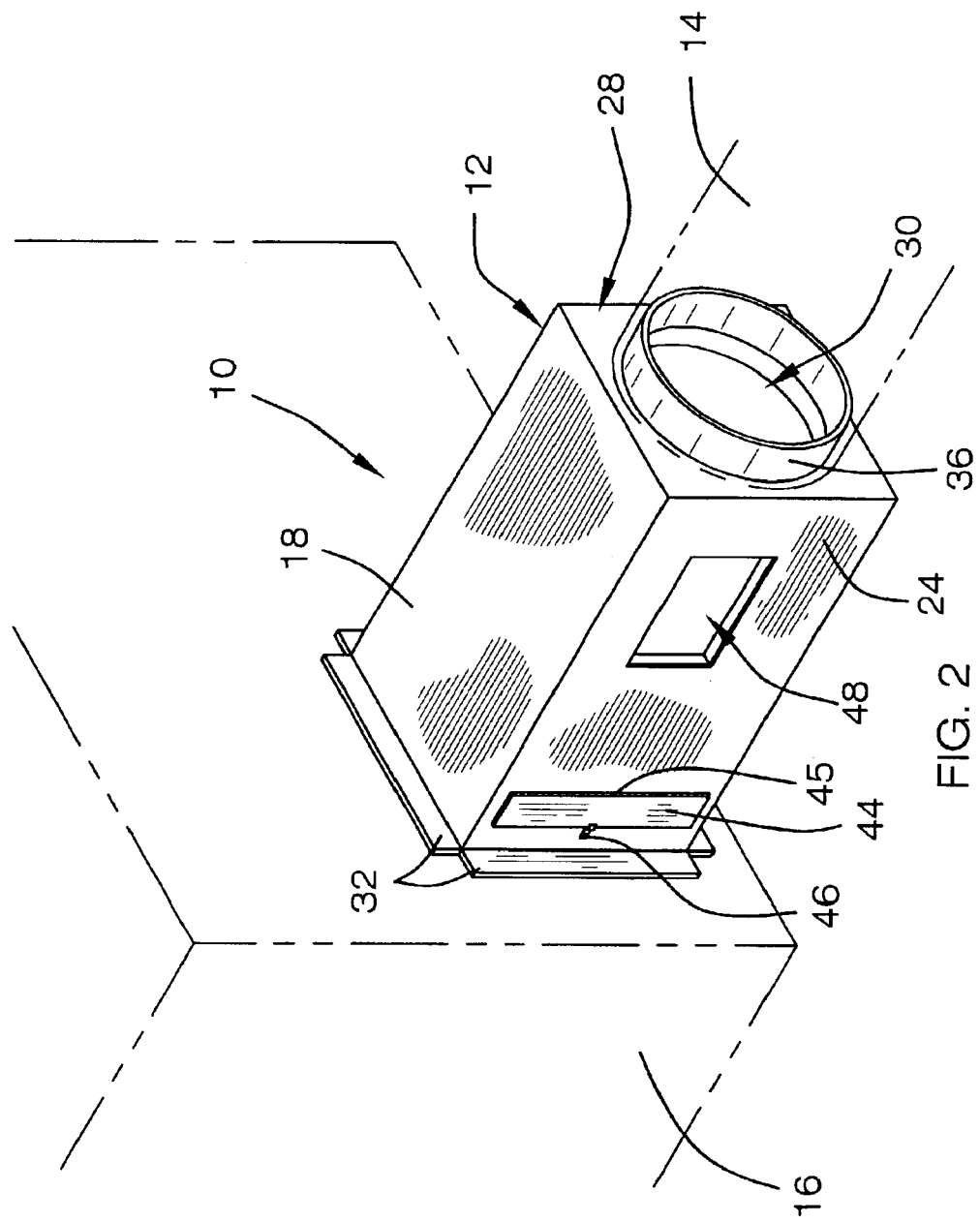
FIG. 2 is an "in use" isometric view of the air filtration system of the present invention.
Figure 3:
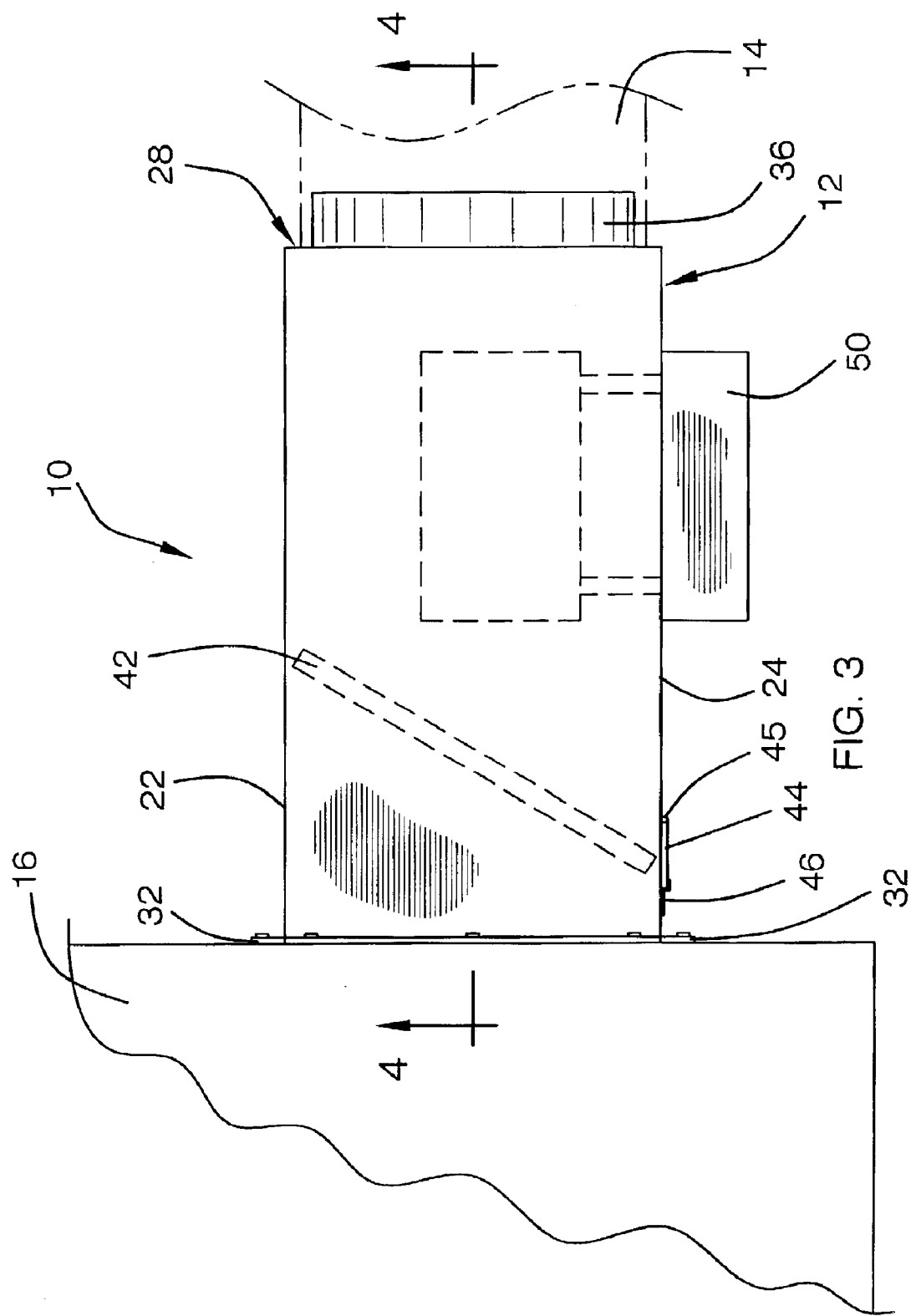
FIG. 3 is a top plan view of the air filtration system of the present invention.

With reference now to the drawings and in particular to FIGS. 1–3 thereof, there is shown, in multiple views, a preferred embodiment of the air filtration system 10 comprising the present invention. This embodiment of the air filtration system 10 is designed to be used with packaged-type air-conditioning systems and includes a housing 12 which is adapted to be mounted in-line with a return air duct 14 of an air-conditioning system 16. The housing 12 has a top wall 18, a bottom wall 20, a first side wall 22, a second sidewall 24, an open proximate end 26, a closed distal end 28 defining an air inlet aperture 30, and an interior surface 31.

Additionally, the housing 12 has at least one mounting flange 32 for securing the air filtration system 10 to the air-conditioning system 16. As illustrated, the mounting flanges 32 are attached to the housing 12 towards the open proximate end 26 and extend perpendicularly therefrom. The mounting flange 32 can be configured to allow the securement of the air filtration system 10 to various types of air-conditioning systems. A sealing strip 34 is attached to the housing 12 around the perimeter of the open proximate end 26, so as to create an air tight seal between the air filtration system 10 and the air-conditioning system 16. The sealing strip 34 can be selected from various materials, such as, but not limited to, an elastomeric rubber, a foam rubber or a high-density foam.

The housing 10 is also fitted with a duct coupling flange 36 so as to allow the attachment of the return air duct 14 to the air filtration system 10. The duct coupling flange extends from the closed distal end 28 of the housing 12 and is formed around the air inlet aperture 30 defined by the closed distal end 28. One skilled in the art will appreciate that the duct coupling flange 36 and the air inlet aperture 30 are illustrated as circular for exemplary purposes only and they may be formed in various other shapes to accommodate the different shapes of air duct work used in air-conditioning systems.

The second sidewall 24 has an air filter access opening 40 and an aperture 48 for receiving an UV air purifier 50 therein. The air filter access opening 40 provides access to a pleated air filter 42 positioned within the housing 12 for purposes of inspection and replacement of the filter. The housing 12 also includes an air filter access door 44 that is attached to the second sidewall 24 and is provided to cover and seal the air filter access opening 40 so as to prevent energy loss that might result from air escaping the air filtration system 10 through the air filter access opening. As illustrated, the air filter access door 44 is pivotally attached to the second side wall 24 by the use of a spring biased hinge 45. Alternatively, the air filter access door 44 may be secured to the second sidewall 24 in a sliding manner by the use of channels. A latch 46 may also be provided for locking the air filter access door 44 in a closed position. The aperture 48 formed through the second sidewall 24 allows the insertion of the UV air purifier 50 into the housing 12 and also provides for the easy replacement or servicing of the UV air purifier 50 if it should malfunction.

The housing 12, the mounting flanges 32, and the duct coupling flange 36 are ideally fabricated from a sturdy sheet metal, such as the material typically used to form other air ducting components used in the field, and the housing 12 and mounting flanges 32 may be coated with an paint. However, it can be appreciated that the housing 12, the mounting flanges 32, and the duct coupling flange 36 can be constructed from any other material that is sufficiently strong enough to support the air filtration system 10 and that can withstand the operational temperature ranges of a typical air-conditioning system.

The pleated air filter 42 is positioned within the housing 12 in the flow path of the return air flowing through the housing 12, thereby removing air borne particulate material. The pleated air filter 42 is a small micron, high flow air filter so as not to create back pressure upon the air-conditioning system, but has a micron mesh rating small enough to ensure the pleated air filter 42 removes the majority of the air borne material. Although such a filter is desired, any typical air filter customarily used for filtering air in an air-conditioning system may be employed, such as a washable or disposable fiber filter or an electrostatic filter.

To further purify the air-conditioner's return air the UV air purifier 50 is positioned in the housing 12 in the flow path of the return air so as to expose the return air to LV radiation to destroy chemical and biological odors, bacterial, viruses and air borne allergens. The UV air purifier 50 exposes the air to UV-C and UV-V wavelengths. The UV-C wavelength is primary used for the destruction of bacteria, microorganisms, and viruses. The UV-V wavelength is used to neutralize odors and destroy chemical pollutants including, but not limited to tobacco smoke, and paint fumes.

Figure 4:
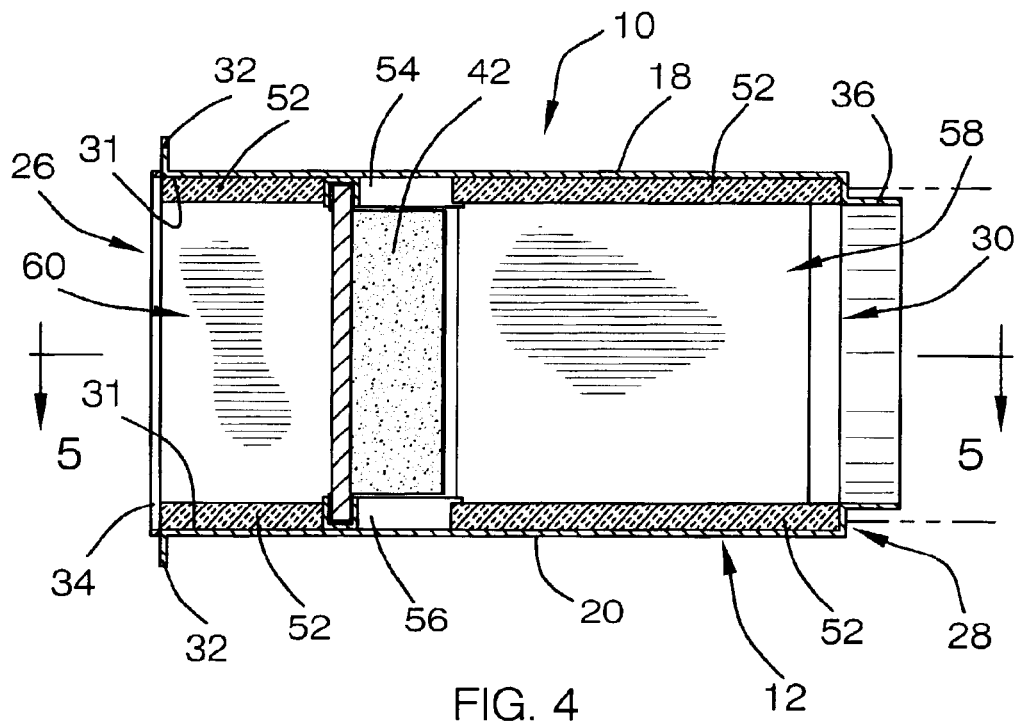
FIG. 4 is a cross-sectional view of the air filtration system taken along line 4—4 in FIG. 3.
Figure 5:
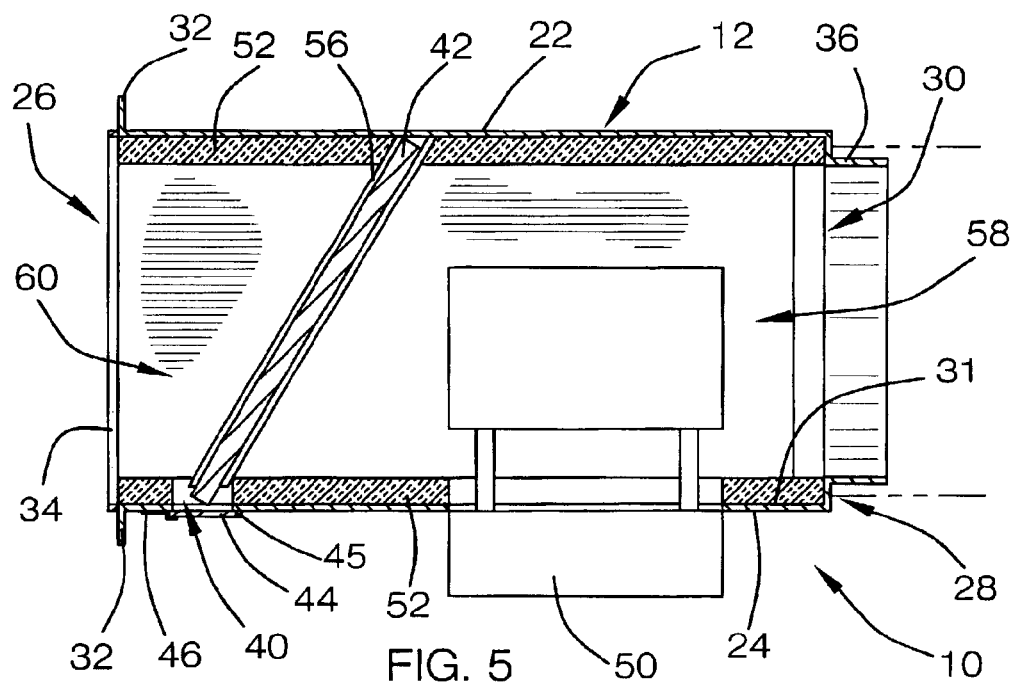
FIG. 5 is a cross-sectional view of the air filtration system taken along line 5—5 in FIG. 4.

Now looking at FIGS. 4 and 5, to prevent energy losses the air filtration system 10 may include an insulation layer 52 which lines the interior surface 31 of the housing 12. The insulation layer 52 is selected from typical insulation materials, including but not limited to general-purpose glasswool or high-density board.

First and second air filter retain members 54 and 56 respectively are transversely mounted to the interior surface 31 of the housing 12 to retaining the pleated air filter 42 in proper alignment within the housing. The filter retaining members 54 and 56 are illustrated as C-shaped channels for exemplary purpose only. It can be appreciated by one of ordinary skill in the art that various means may be used to properly retain the pleated air filter 42 within the housing 12. Such other means may include L-shaped channels or discretely positioned L-Shaped or C-Shaped brackets.

The pleated air filter 42 is positioned within the housing 12 so as to divide the housing into two distinct and separate chambers. More specifically, an air-inlet chamber 58 and an air exit chamber 60. The UV air purifier 50 is inserted through the second aperture 48 formed through the second side wall 24 and into the air-inlet chamber 58.

Figure 6:
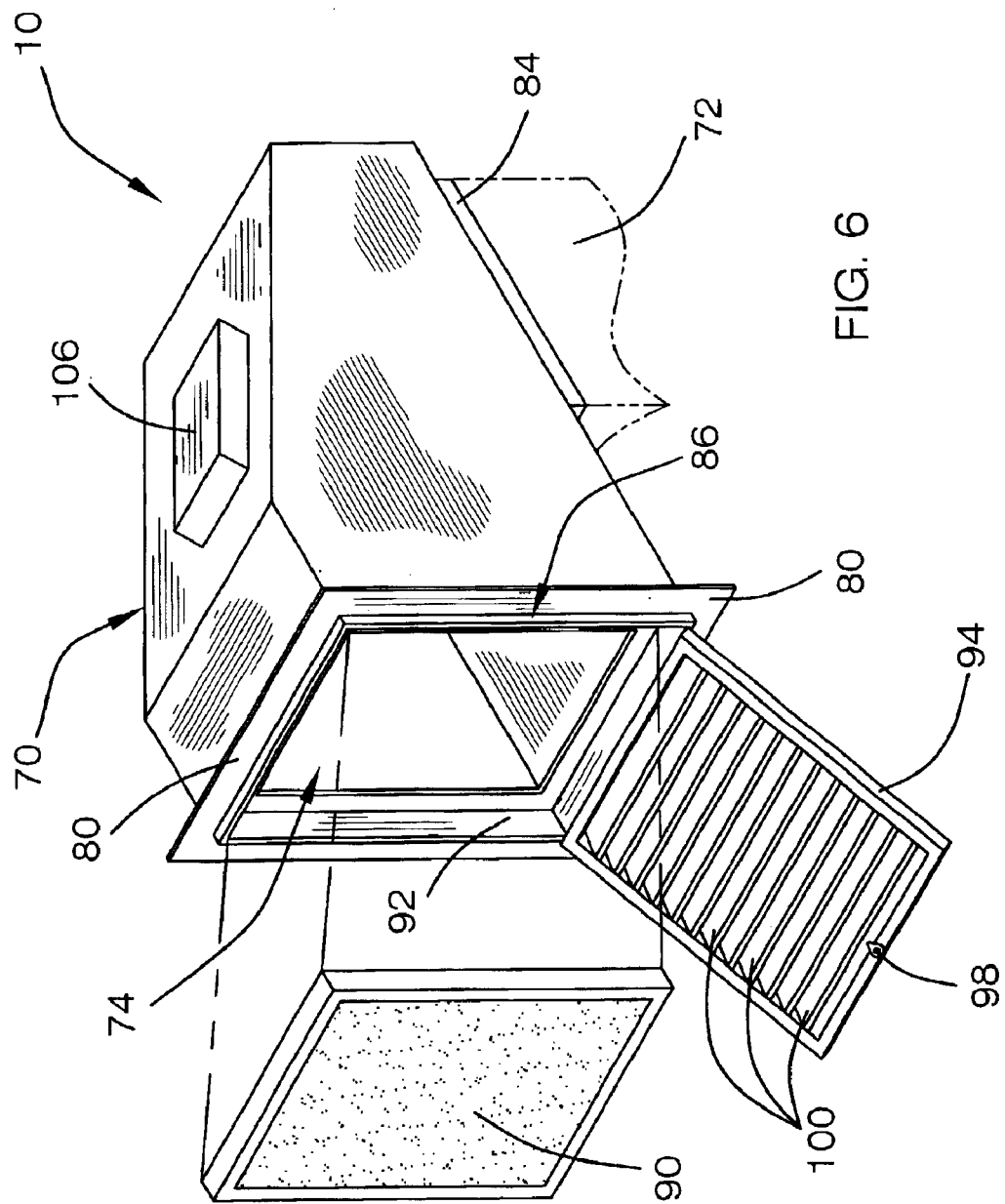
FIG. 6 is an isometric view of an alternate embodiment of the air filtration system of the present invention.

Now turning to FIG. 6, which depicts an alternate embodiment of the present invention which is designed to be used with a split-type air-conditioning system. While the over structure of the housing 70 is slight different from the housing 12 described above, one of ordinary skill in the art of air-conditioning will appreciate that the same objectives are present in both embodiments and that both embodiments are illustrated as examples to how the configuration of the housing may be altered to allow the installation of the air filtration system 10 with various types of air-conditioning systems.

The housing 70 which is adapted to be mounted in-line with a return air duct 72 of a split conditioning system, includes an air inlet 74, an air exit 76, and an aperture 78. Additionally, the housing 70 includes at least one mounting flange 80 for securing the housing to a mounting surface, such as a wall 82. The mounting flanges 80 can be configured to allow the securement of the air filtration system 10 to different wall configurations.

Figure 7:
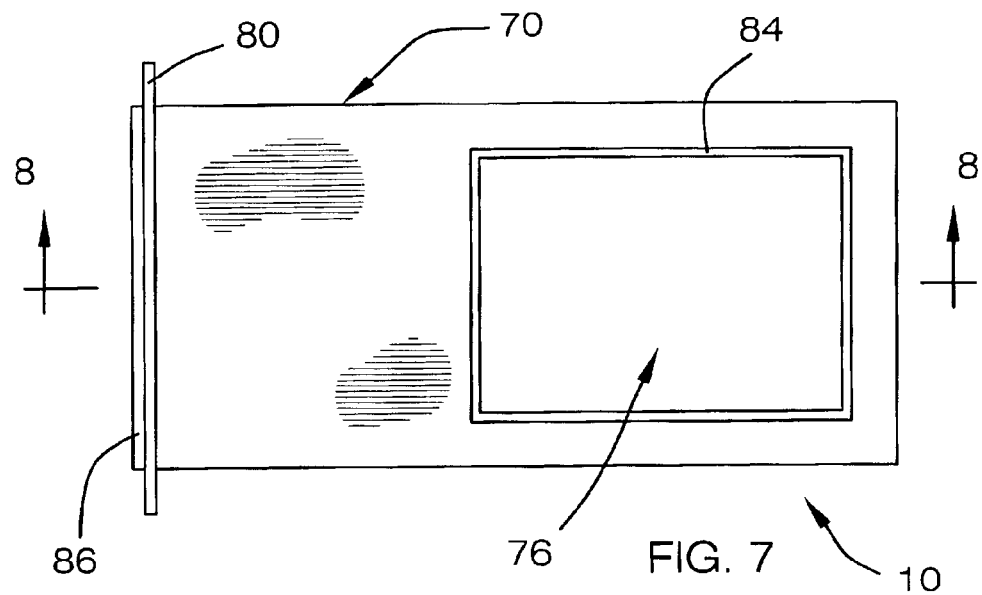
FIG. 7 is a bottom plan view of the alternate embodiment of the air filtration system of the present invention.

In FIG. 7, the housing 70 is fitted with a duct coupling flange 84 so as to allow the attachment of the return air duct 72 to the air filtration system 10. One skilled in the art will appreciate that the duct coupling flange 84 and the air inlet 74 are illustrated as rectangular for exemplary purposes only and may be formed in various other shapes to accommodate the different shapes of air duct work used in air-conditioning systems.

The housing 70, the mounting flanges 80 and the duct coupling flange 84 are ideally fabricated from a sturdy sheet metal, such as the material typically used to form other air ducting components in the field. However, it is appreciated that the housing 70, the mounting flanges 80 and the duct coupling flange 84 can be constructed from any other material this is sufficiently strong enough to support the air filtration system 10 and can withstand the operational temperatures ranges of a typical air-conditioning system.

Now referring back to FIG. 6, a doorframe 86 is secured to the housing 70 within the perimeter 88 of the air inlet 74. The door frame 86 is adapted to receive a pre-stage air filter 90 within a recess 92 formed into the doorframe. A door 94 is pivotally attached to the door frame 86 by a hinge 96 (FIG. 8); this allows the door to open with respect to the door frame allowing access to the pre-stage filter 90 and the interior 112 of the housing 70. The door 94 includes a latch 98 which secures the door closed to the doorframe 86 retaining the pre-stage air filter 90 within the recess 92. The door 94 is allow fitted with louvers 100 so as to more efficient direct air flowing through the door towards the pre-stage air filter 90.

Figure 8:
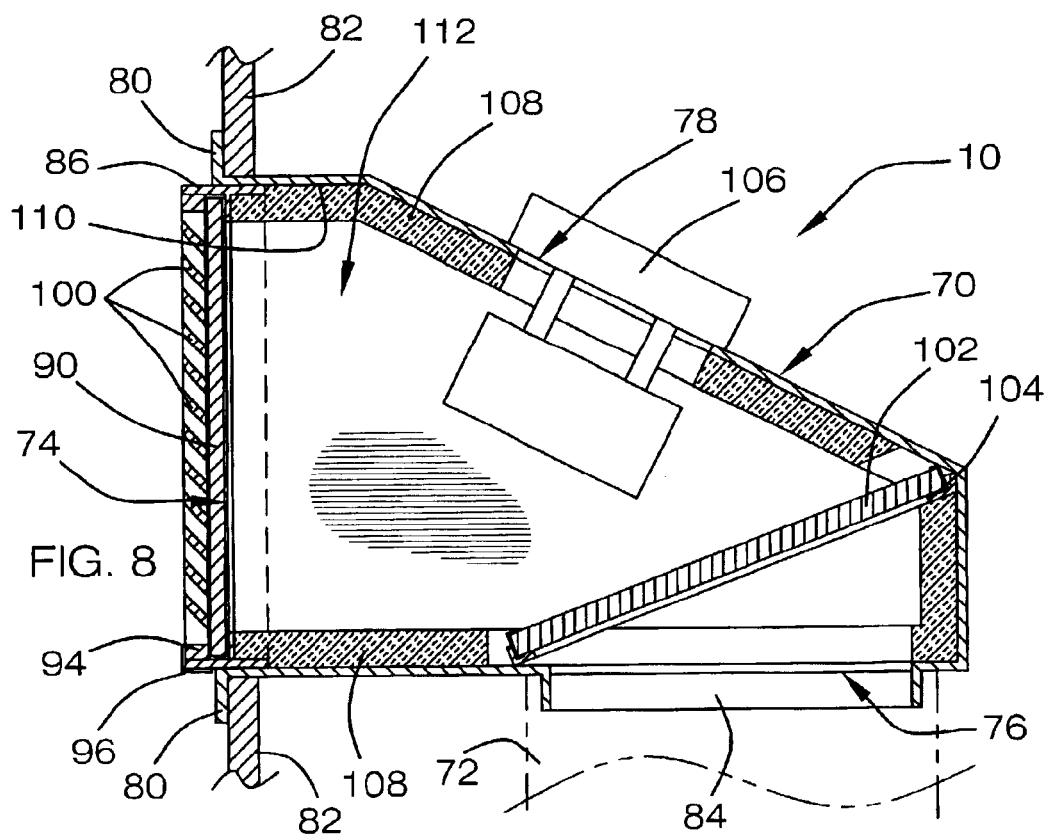
FIG. 8 is a cross-sectional view of the alternate embodiment of the air filtration system taken alone line 8—8 in FIG. 6.

Referring to FIG. 8, a pleated air filter 102 is positioned within the housing 70 and retained therein by an air filter retaining member 104. The pleated air filter 102 is a small micron high flow air filter. Although such a filter is desired, any typical air filter customarily used for filtering air in an air-conditioning system may be employed, such as washable or disposable fiber filters or an electrostatic filter.

To prevent energy losses the air filtration system 10 may include an insulation layer 108 that lines the interior surface 110 of the housing 70. The insulation layer 108 is selected from typical insulation materials, including but not limited to general-purpose glasswool or high-density board.

To further purify the return air an UV air purifier 106 is positioned within the housing 70 in the flow path of the return air so as to expose the return air to UV radiation to destroy chemical and biological odors, bacterial, viruses and air borne allergens. The UV air purifier 106 exposes the return air to UV-C and UV-V wavelengths. The UV-C wavelength is primary used for the destruction of bacteria, microorganisms, and viruses. The UV-V wavelength is used to neutralize odors and destroy chemical pollutants including, but not limited to tobacco smoke, and paint fumes. UV air purifier 106 is positioned within the housing 70 by inserting it through the aperture 78 and into the interior 112 of the housing.

While preferred embodiments of the air filtration system have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An air filtration system for use with an existing air-conditioning system having an enclosure for receiving air to be treated via a return air duct, the air filtration system comprising:
   a housing adapted to be mounted in-line with and intermediate of said enclosure and said return air duct, wherein said housing has an aperture for receiving an UV air purifier therein, an open proximate end, and a distal end defining an air inlet aperture;
   at least one mounting flange extending from said open proximate end of said housing for mounting said housing to said enclosure;
   a duct coupling flange formed around said air inlet aperture and extending from said distal end of said housing for coupling said return air duct to said housing; and
   at least one air filter retaining member positioned within said housing for receiving an air filter therein.

2. The air filtration system of claim 1, further comprising: an insulation layer lining an interior surface of said housing.

3. The air filtration system of claim 2, wherein: said housing has an air filter access opening for allowing access to said air filter.

4. The air filtration system of claim 3, further comprising:
   an air filter access door attached to said housing so as to cover said air filter access opening.

5. The air filtration system of claim 1, wherein:
   said duct coupling flange extends from said distal end of said housing and further wherein said coupling flange is formed to follow the perimeter of said air inlet aperture.

6. The air filtration system of claim 1, wherein said air filter is received by said housing and divides said housing into an air-inlet chamber and an air exit chamber; and further wherein said UV air purifier is positioned within said air-inlet chamber.

7. The air filtration system of claim 1, further comprising:
   a layer of insulating paint coated on said housing.

8. The air filtration system of claim 1, further comprising:
   a sealing strip attached to said housing around the perimeter of said open proximate end to provide an air tight seal between said housing and said enclosure.

9. An air filtration system for use with a typical split air conditioning system having a return air duct for transporting air to be treated to an enclosure, the air filtration system comprising:
   a housing adapted to be mounted in-line with said return air duct, said housing defining an air inlet, an air exit and an aperture for receiving an UV air purifier therein;
   at least one mounting flange extending from said housing for mounting said housing to a surface;
   a duct coupling flange extending from said housing for coupling said return air duct to said housing;
   a air filter;
   a filter retaining member positioned within said housing for receiving and retaining said air filter within said housing;
   a pre-stage air filter;
   a doorframe mounted to said housing within the perimeter of said air inlet, wherein said door frame defines a recess for receiving said pre-stage air filter; and a louvered door hingidly coupled to the door frame.

10. An air filtration system for use with an existing air-conditioning system having an enclosure for receiving air to be treated via a return air duct, the air filtration system comprising:

- a housing adapted to be mounted in-line with and intermediate of said enclosure and said return air duct with a return air duct of an air-conditioning system, wherein said housing has an aperture for receiving an UV air purifier therein, an open proximate end, and a distal end defining an air inlet aperture;
- at least one mounting flange extending from said open proximate end of said housing for mounting said housing to said enclosure;
- a duct coupling flange formed around said air inlet aperture and extending firm said distal end of the said housing for coupling said return air duct to said housing;
- an air filter;
- at least one air filter retaining member positioned within the said housing for receiving and retaining said air filter therein; and
- wherein said air filter is received by said housing and divides said housing into an air-inlet chamber and an air exit chamber, and further wherein said UV air purifier is positioned within said air-inlet chamber.

11. The air filtration system of claim 10, further comprising:

- a layer of insulating paint coated on said housing.

12. The air filtration system of claim 10, further comprising:

- a sealing strip attached to said housing around the perimeter of said open proximate end to provide an air tight seal between said housing and said enclosure.

13. The air filtration system of claim 10, further comprising:

- an insulation layer lining an interior surface of said housing.

14. The air filtration system of claim 10, wherein:

said housing has an air filter access opening for allowing access to said air filter.

15. The air filtration system of claim 14, further comprising:

- an air filter access door attached to said housing so as to cover said air filter access opening.

* * * * *